UNITED STATES PATENT OFFICE.

BENJAMIN FRANKLIN CRESSON, OF PHILADELPHIA, PENNSYLVANIA.

DYEING ANILINE-BLACK.

SPECIFICATION forming part of Letters Patent No. 390,842, dated October 9, 1888.

Application filed December 2, 1886. Serial No. 220,517. (No specimens.) Patented in England September 10, 1886, No. 38.

*To all whom it may concern:*

Be it known that I, BENJAMIN F. CRESSON, of the city and county of Philadelphia, and State of Pennsylvania, have invented a new and useful Composition of Matter and New Method of Compounding the Same to be Used in Dyeing Aniline-Black, (for which I have obtained a patent in Great Britain, No. 38, dated September 10, 1886,) of which the following is a specification.

My composition consists of the following ingredients, combined in about the proportions and in the manner stated, viz: I first form a liquor of sixty liters water, three kilos chlorate potash, two kilos sal-ammoniac, two kilos sulphate copper, two kilos nitrate iron and twelve liters tragacanth gum, (dissolved.) I then form another liquid of nine kilos aniline-oil and nine kilos muriatic acid. To this add one thousand five hundred grams tartaric acid and one hundred and thirty liters water. These two liquors are now to be thoroughly mixed together, which forms a practical aniline-black dye, in which fabrics may be colored without injury to the texture or fiber of the fabric.

Having thus described my invention, what I claim as new, and desire to secure by Letters Patent, is—

1. The herein-described composition of matter, consisting of water, chlorate potash, sal-ammoniac, sulphate of copper, nitrate iron, tragacanth gum, aniline-oil, muriatic acid, and tartaric acid, in about the proportions named.

2. The process of forming an aniline coloring solution herein described, which consists in first dissolving and mixing together water, chlorate potash, sal-ammoniac, sulphate copper, nitrate iron, and tragacanth gum, forming one liquor, then forming another liquor composed of aniline-oil, muriatic acid, tartaric acid, and water, and finally mixing these two liquors together, substantially as described.

3. The herein-described composition of matter, which consists of water, chlorate of potash, sal-ammoniac, sulphate of copper, nitrate iron, aniline-oil, muriatic acid, and tartaric acid, in about the proportions named.

BENJAMIN FRANKLIN CRESSON.

Witnesses:
ROBERT ELLIOTT,
F. H. LUBBE.